United States Patent [19]
Kelman et al.

[11] Patent Number: 5,804,511
[45] Date of Patent: Sep. 8, 1998

[54] COMPOSITE MOTOR VEHICLE BUMPER BEAM

[75] Inventors: Josh Kelman, Dover; Gullmar V. Nelson, Durham, both of N.H.

[73] Assignee: Davidson Textron Inc., Dover, N.H.

[21] Appl. No.: 629,914

[22] Filed: Apr. 10, 1996

Related U.S. Application Data

[63] Continuation of Ser. No. 246,758, May 20, 1994, abandoned.

[51] Int. Cl.[6] .............................. B60R 19/32; B60R 19/08
[52] U.S. Cl. ........................ 442/172; 442/180; 442/182; 442/245; 442/293
[58] Field of Search ................................ 293/102, 120; 442/172, 180, 182, 245, 293

[56] References Cited

U.S. PATENT DOCUMENTS 4,525,005  6/1985  Prochaska et al. .
5,277,462  1/1994  Verzelli et al. .

OTHER PUBLICATIONS

Oeitel, G; Polyurethane Handbook, 2d Edition, 1993, pp. 346–347.

*Primary Examiner*—Richard Weisberger
*Attorney, Agent, or Firm*—Reising, Ethington, Barnard & Perry

[57] ABSTRACT

A structural reaction injection molded motor vehicle bumper beam comprises a preform formed of layers of interlaced glass fibers and chopped glass fibers wherein most of the interlaced fibers are oriented longitudinally of the bumper beam. A two-component, non-filled reaction injection molding polymeric/pure polyurethane based resin with a neat elongation in excess of about 50% bonds the fiberglass layers together in a composite bumper beam structure wherein the fiberglass provides substantial strength and stiffness and the highly compliant resin allows extensive beam deflection without catastrophic cracking to enable the bumper beam without other assistance to absorb sufficient energy in repeated impacts to meet in-service requirements.

4 Claims, 3 Drawing Sheets

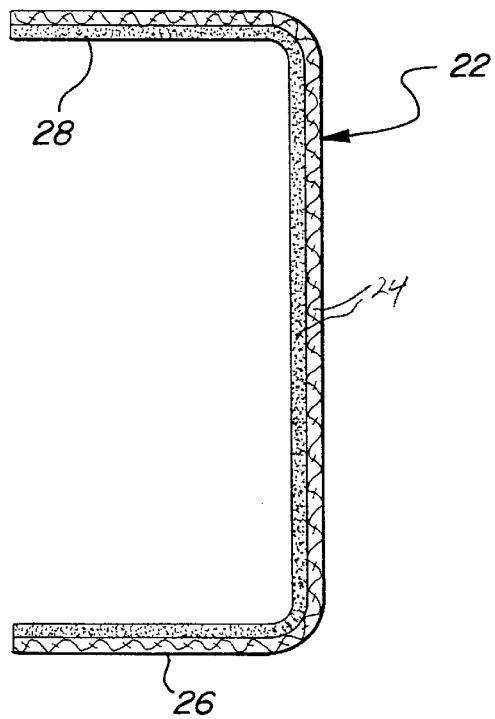
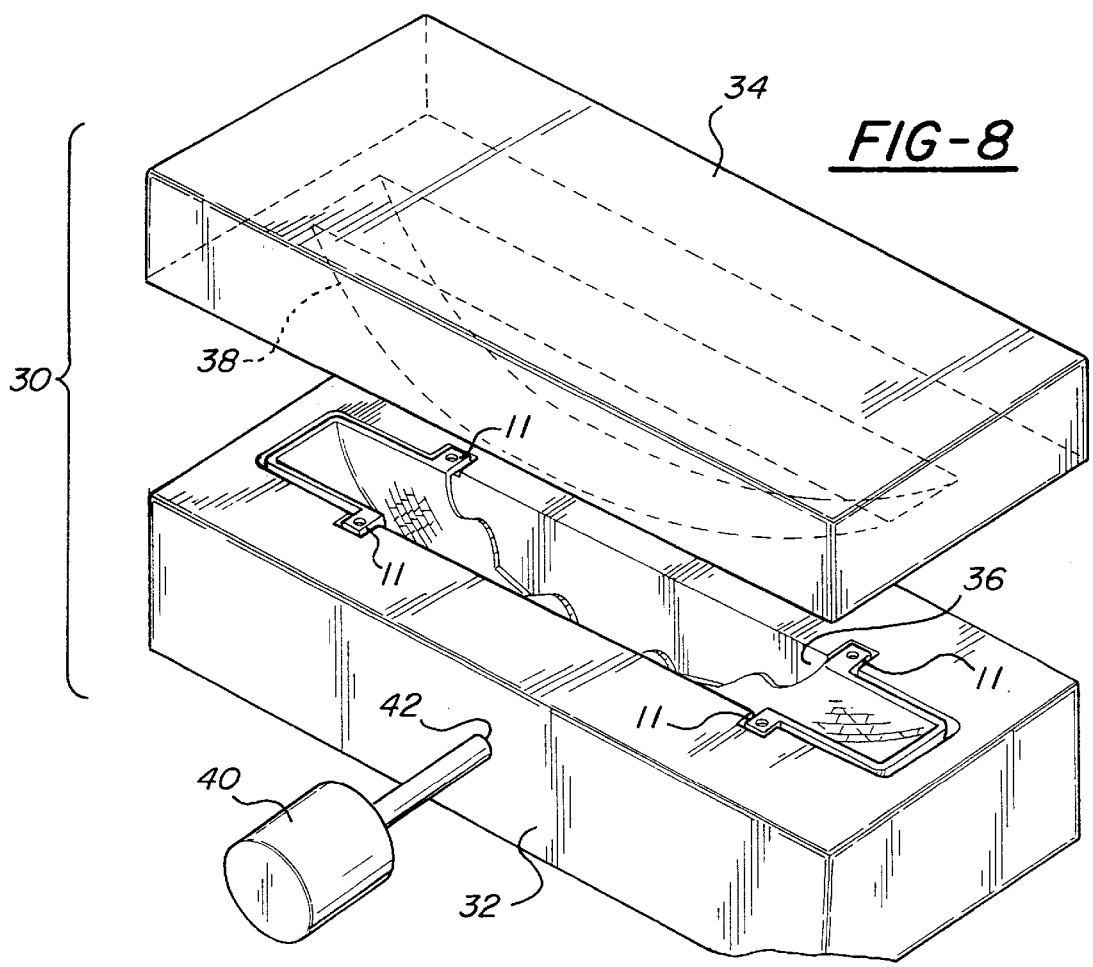

COMPOSITE MOTOR VEHICLE BUMPER BEAM

This application is a continuation of copending application Ser. No. 08/246,758 filed on May 20, 1994, now abandoned.

TECHNICAL FIELD

This invention relates to composite motor vehicle bumper beams and more particularly to structural reaction injected molded motor vehicle bumper beams having no additional energy absorber.

BACKGROUND OF THE INVENTION

In meeting Federal passenger car safety standards, the front bumper must pass a series of 2.5 mph impacts without allowing damage to the vehicle. Moreover, some car manufacturers require even more stringent standards such as a 5 mph pendulum impact followed by a 5 mph barrier impact. Various forms of bumper beams have been developed in an effort to meet these standards including the use of reinforced polypropylene, sheet molding compounds, and metals in various configurations More recently, SRIM (structural reinforced injection molded) bumper beams have become a light weight construction alternative successfully competing in some instances against the above technologies. But they have thus far had to rely on the assistance of foam energy absorbers to meet the impact standards and as a result suffer from this added cost penalty. The competition bumper beams require energy absorbers as well. For example, the currently used form of SRIM bumper beam that meets these standards is limited to small deflections of less than 2.5 inches as the larger deflections necessary to absorb the test impacts will cause bumper breakage allowing damage to the vehicle. As a result, these bumper beams are by design limited to deflections up to about 2 inches by incorporating the assistance and the accompanying added cost of foam energy absorbers to manage the impact energy. In such bumper beams, the energy is managed by bolstering the foam so that it initially compresses on impact while the bumper beam deflects within its permissible range of up to about 2 inches in absorbing the remaining impact energy before vehicle damage can occur.

SUMMARY OF THE INVENTION

The present invention obviates the need of a SRIM motor vehicle bumper beam for such foam or other energy absorber assistance. This has been accomplished following on the discovery of the root cause of the problem. In a series of 5 mph impact tests of a number of conventional type SRIM bumper beams but without foam energy absorber assistance, these bumper beams were all found to fail catastrophically when deflected a maximum of about 2.5" but not on the first impact. They failed by propagation of a crack initiated during one of the earlier impacts. In analyzing this crack propagating failure mode, it was found that traditional SRIM material systems have been employed using urethane/urea formulated resins having a low neat elongation of about 10–20%; neat elongation referring to the elongation of a reaction injected molded part without a preform or any other type of reinforcement, and neat elongation being defined as the percentage of elongation as measured by standard tensile testing. While such urethane/urea based resins with a low neat percentage do combine well with bumper preforms that are typically composed of interlaced and chopped glass fiber to form a strong and stiff bumper beam, their limited elongation ability is what dictates the addition of foam energy absorbers to meet the various impact performance requirements.

The present invention is in a material/process SRIM system that allows the resulting composite bumper beam to singularly absorb all the energy through deflection in meeting the various impact performance requirements. This is accomplished with a reaction injection molding polymeric/pure polyurethane based resin having a neat percentage in excess of about 50% and by establishing a proportioning between the resin and preform of about 45 percent resin and 55 percent preform. The preform resembles the bumper beam and is comprised of various combinations of layers of interlaced glass fibers and chopped glass fibers that are bonded together in readiness for the reaction injection molding. In all such layered combinations, the interlaced glass fibers are oriented so that most of them lay parallel to the highest stress direction which is lengthwise of the bumper beam The preform is positioned in a closed mold conforming to the desired external surface of the bumper beam and the two-component resin is injected into the mold, impregnates the bumper preform, and acts as a matrix resin to bond the glass fibers intimately together on polymerization and form an extremely high strength composite bumper beam characterized by its ability to deflect a very significant amount under repeated impacts without incurring catastrophic failure.

The preform produces high strength in the beam while the high elongation resin produces resistance in the beam to crack growth and the ability to deflect a very significant amount in absorbing the impact energy. While some cracks may still occur at very large deflections, they then do not propagate to catastrophic failure permitting damage to the vehicle proper even where the bumper beam is repeatedly deflected to about twice that caused failure before the invention at the same impact energy levels.

It is therefore an object of the present invention to provide a new and improved composite motor vehicle bumper beam.

Another object is to provide a reaction injected molded composite motor vehicle bumper beam comprised of an interlaced and chopped glass fiber preform wherein most of the interlaced fibers are oriented longitudinally of the bumper beam and wherein the preform is reaction injection molded with a nonfilled polymeric/pure polyurethane based resin with a highly tolerable elongation characteristic.

Another object is to provide a reaction injection molded composite motor vehicle bumper beam comprised of a preform having layers of interlaced and chopped glass fibers with most of the interlaced fibers oriented longitudinally of the bumper beam and a polymeric/pure polyurethane based resin with a neat elongation in excess of 50%.

Another object is to provide a composite motor vehicle bumper beam comprised of a preform having layers of interlaced and chopped glass fibers adapted and arranged in sandwich fashion so that most of the interwoven fibers lay parallel of the bumper beam and a polymeric/pure polyurethane based resin formulated for large elongation in excess of 50% neat that is injected into a mold with the preform and impregnates the latter and reacts to form a composite bumper beam with an unusually high deflection characteristic.

These and other objects, advantages and features of the present invention will become more apparent from the following detailed description and drawings wherein:

BRIEF DESCRIPTION OF THE DRAWINGS

FIG. 7 is a view like FIGS. 5 and 6 showing still another embodiment of the invention; and FIG. 8 is an exploded perspective view of the mold used to construct the bumper beam in FIG. 1 with the preform in place.

DETAILED DESCRIPTION OF THE DRAWINGS

Figure 1:
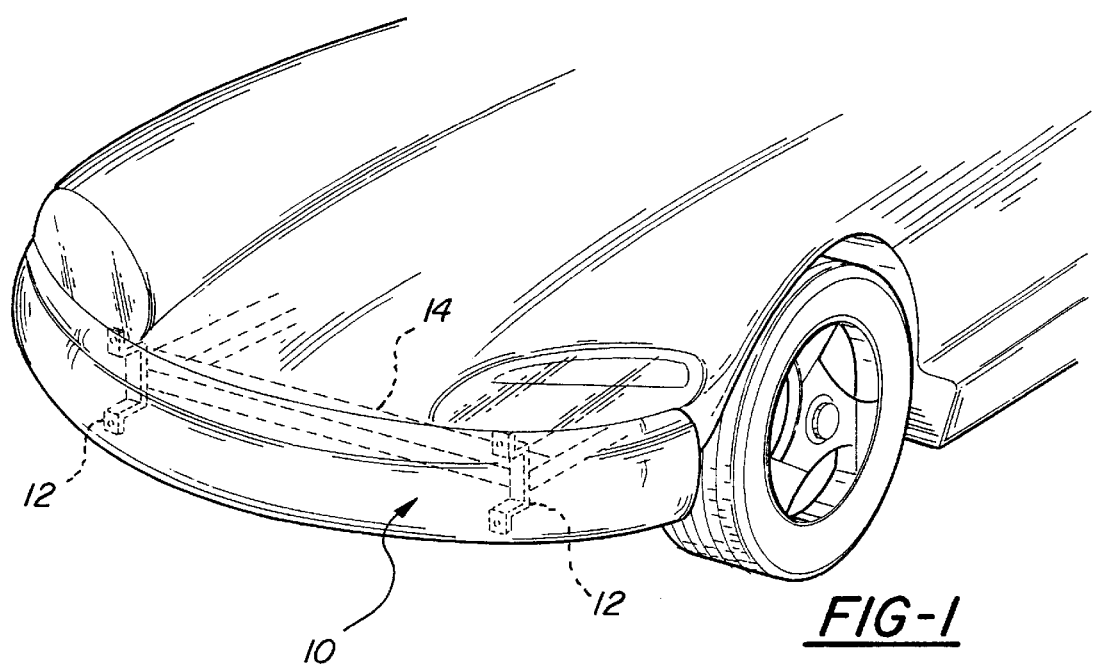
FIG. 1 is a perspective view of a composite bumper beam constructed according to the present invention installed on the front end of a motor vehicle.
Figure 2:
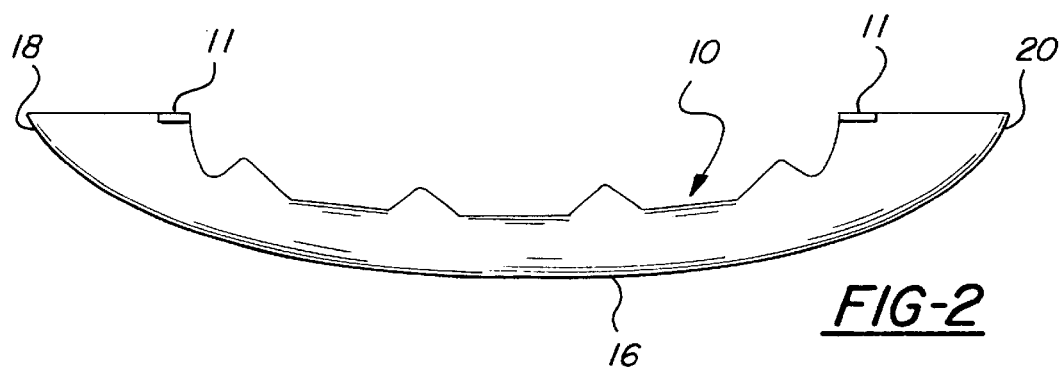
FIG. 2 is an enlarged top elevational view of the bumper beam shown in FIG. 1.
Figure 3:
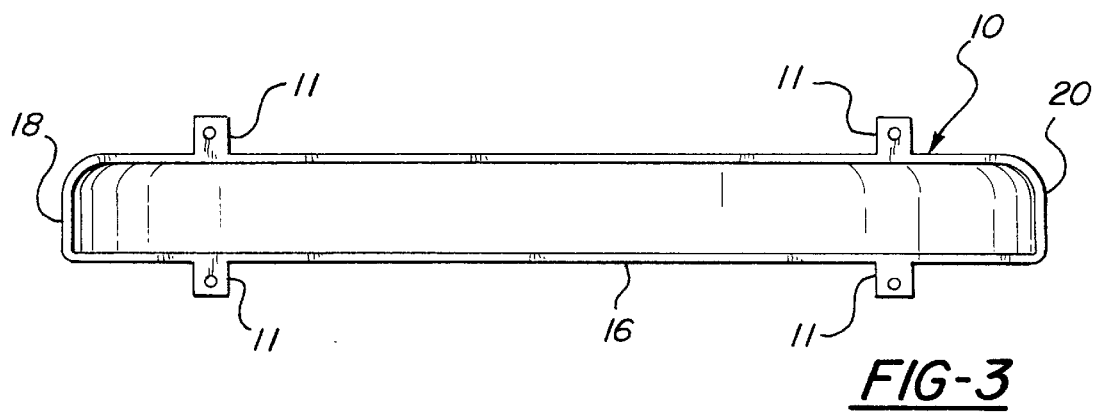
FIG. 3 is a rear elevational view of the preform used in the construction of the bumper beam in FIG. 1.

Referring to FIG. 1, there is illustrated a composite bumper beam 10 constructed according to the present invention attached by two support brackets 12 to the front end of a motor vehicle frame 14. As mounted, the composite bumper beam 10 incurs the greatest deflections on direct impact at a point 16 midway of the support brackets 12 and to a lesser degree at its two distal ends 18 and 20. The deflections referred to herein are the critical or maximum deflections that the bumper beam will incur and are measured at the center of the bumper beam illustrated; however, it will be understood that depending on the sweep or curvature of the bumper beam and what is backing up the beam, the deflection at other points may be more critical but the amount of deflection that can occur before failure remains essentially the same.

The material/process SRIM system of the present invention uses materials comprising a fiberglass preform 22 and two-component urethane based resin 24 polyol and isocyanate in an injection reaction molding process to produce the composite bumper beam 10 in a form that has sufficient strength and energy absorbing ability to singularly resist and absorb energy through deflection in meeting the Federal 5 mph impact performance requirements in the repeated series of impacts required in the test as well as a 5 mph pendulum test followed by a 5 mph barrier test. The preform 22 is comprised of a certain arrangement of fiberglass materials and the resin 24 is a polymeric/pure polyurethane based resin formulated for large elongation, i.e. in excess of 50% neat. The polyurethane component as formulated has a characteristically low crosslink density for high polymer flexibility obtained with a low concentration of crosslinkers and a characteristically large amount of long chain polyol that further increases elongation and reduces brittleness. The toughness of the polymer resulting from a lowered crosslink density and increased long chain polyol is then further enhanced by converting from a polymeric MDI (methylene di isocyanate) to a polymeric/pure or pure MDI prepolymer. The resin 24 was formulated under the direction of the inventors and is available from Miles Corporation, Pittsburgh, Pa.

Figure 4:
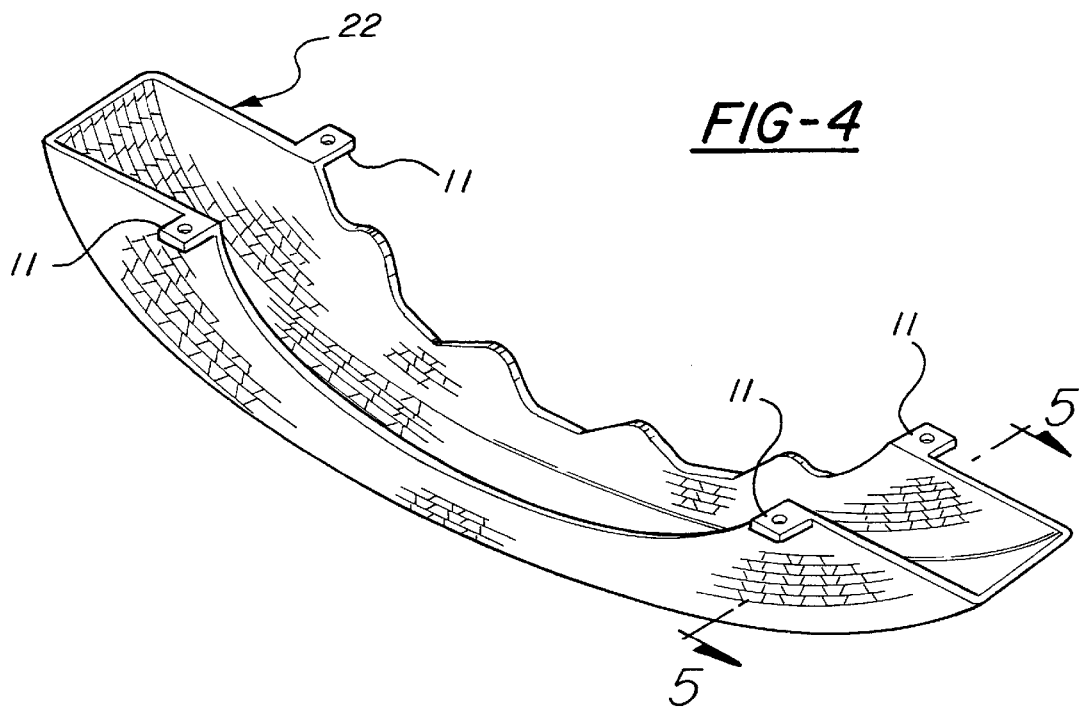
FIG. 4 is a view in perspective of the bumper beam shown in FIGS. 1–3.
Figure 5:
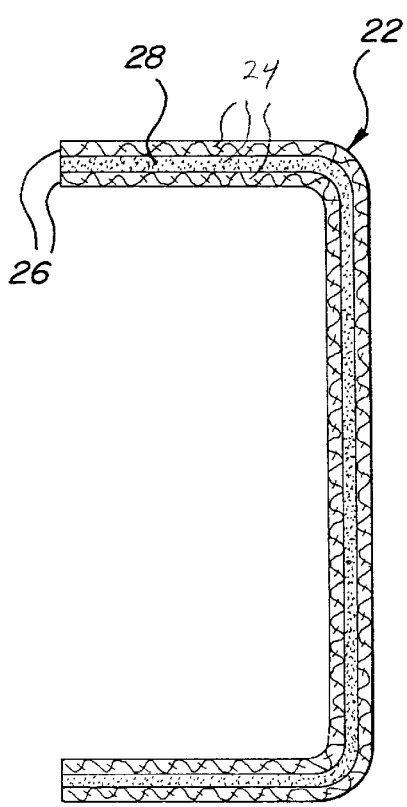
FIG. 5 is an enlarged sectional view taken along the line 5—5 in FIG. 4 looking in the direction of the arrows.
Figure 6:
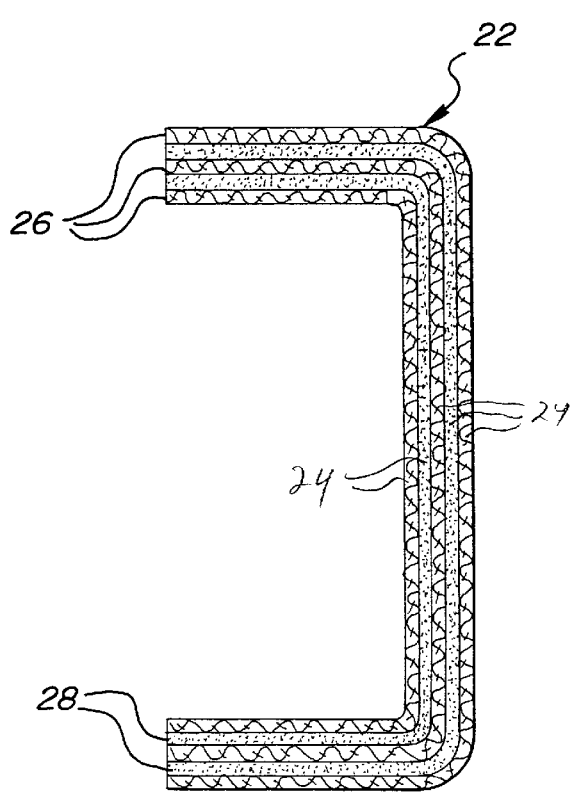
FIG. 6 is a view like FIG. 5 showing another embodiment of the invention.

The preform 22 is comprised of layers of interlaced glass fibers 26 and chopped glass fibers 28. The layers 26 and 28 are arranged in sandwich fashion with the chopped fibers in the middle as illustrated in FIG. 5, or with alternating layers as illustrated in FIG. 6, or simply in open face sandwich fashion with the interlaced fiber layer 26 on one side and the chopped fiber layer 28 on the other side as illustrated in FIG. 7. In all such layered combinations, the preform fabric layer 26 which may be knit or woven or otherwise laced together is adapted and oriented so that most (greater than 66%) of the interlaced fibers lay in the highest stress direction which is lengthwise and parallel of the bumper beam. See FIG. 4.

The preform materials 26 and 28 are laid up in a female cavity mold to resemble the final bumper beam and are bonded together in preparation for injection molding by any one of several methods such as the directed fiber process or a thermoformable mat process.

As illustrated in FIG. 7, the bumper beam 10 is reaction injection molded in a two-piece mold 30 having a lower half 32 and upper half 34. The lower mold half 32 has a cavity 36 defining the exterior or front side surface of the bumper beam and the upper mold half 34 has a male form 38 defining the backside surface of the bumper beam. The preform 22 is positioned in the cavity 36 in the lower mold half 32 with most of the preform fibers laying parallel to the length of the bumper beam and the upper mold half 34 is then lowered and clamped in place to close the mold. Space is provided between the bumper beam defining mold surfaces 36 and 38 and the preform 22 and relative to the interstices in the preform to produce the desired resin to preform ratio of 40–60%. With the mold 30 held closed with the preform 22 in place, the two components, polyol and isocyanate, of the resin 24 are mixed and then injected into the mold cavity about and into the preform through passages 40 in the mold halves. The resin 24 impregnates the preform 22 throughout its layers 26 and 28 and then undergoes polymerization and acts as matrix mix to form the unusually high-strength composite bumper beam 10.

The strategically lengthwise oriented fibers in the interlaced layer(s) 26 produce high strength in the bumper beam while the large elongation resin 24 produces significant resistance to cracking and crack growth and thereby the ability to deflect a very significant amount in absorbing the impact energy. While some cracks may still occur at very large deflections, they then do not propagate to catastrophic failure even where the bumper beam is repeatedly deflected to about twice that caused failure before the invention. For example, in tests conducted with bumper beams made of polyurethane based resin but with a neat elongation of about 10% and without most of the fibers oriented parallel of the bumper beam, these bumper beams all failed catastrophically (fractured and broke) when deflected a maximum of 2.5 inches during the Federally required series of impacts at 5 mph and would thus require energy absorbing assistance if they are to eventually pass these tests. Tests of the composite bumper beam 10 of the present invention have demonstrated its ability to deflect up to about 4–5 inches thereby absorbing additional energy and without catastrophic beam failure or damage to the vehicle and thus without requiring additional energy absorbing assistance.

The invention has been described in an illustrative manner with respect to presently preferred embodiments, and it is to be understood that the terminology that has been used is intended to be in the nature of words of description rather than of limitation. Obviously, many modifications and variations of the present invention in light of the above teachings may be made. It is therefore to be understood that within the scope of the appended claims, the invention may be practiced otherwise than as specifically shown and described.

What is claimed is:

1. A reaction injection molded composite motor vehicle bumper beam comprising a preform of fiberglass material; a resin impregnating said fiberglass; said resin having a polyol component and an isocyanate component substantially being a MDI prepolymer and having a neat elongation greater than 50% whereby said bumper beam deflects greater than 2.5 inches at the center of the preform when impacted at 5 mph without cracking.

2. A reaction injection molded composite motor vehicle bumper beam as set forth in claim 1 wherein said fiberglass includes interlaced woven glass fiber fabric and a layer of chopped fiberglass.

3. A reaction injection molded composite motor vehicle bumper beam as set forth in claim 2 wherein there are at least two layers of glass fiber fabric sandwiching said layer of chopped fiberglass.

4. A reaction injection molded composite motor vehicle bumper beam as set forth in claim 2 wherein over 66% of said glass fibers are oriented parallel and lengthwise of the bumper beam.

\* \* \* \* \*